(12) United States Patent
Sarkis et al.

(10) Patent No.: US 12,317,235 B2
(45) Date of Patent: May 27, 2025

(54) MAPPING TWO-STAGE SIDELINK CONTROL WITH MULTI-LAYER SIDELINK DATA CHANNEL

(71) Applicant: QUALCOMM Incorporated, San Diego, CA (US)

(72) Inventors: Gabi Sarkis, San Diego, CA (US); Wanshi Chen, San Diego, CA (US); Alexandros Manolakos, Escondido, CA (US); Kapil Gulati, Belle Mead, NJ (US); Sudhir Kumar Baghel, Hillsborough, NJ (US); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/670,607

(22) Filed: May 21, 2024

(65) Prior Publication Data
US 2024/0422740 A1    Dec. 19, 2024

Related U.S. Application Data

(63) Continuation of application No. 17/068,561, filed on Oct. 12, 2020, now Pat. No. 11,991,665.
(Continued)

(51) Int. Cl.
*H04W 72/40*    (2023.01)
*H04L 1/00*    (2006.01)
(Continued)

(52) U.S. Cl.
CPC ........... *H04W 72/02* (2013.01); *H04L 1/0013* (2013.01); *H04L 27/2607* (2013.01);
(Continued)

(58) Field of Classification Search
CPC ..... H04W 72/02; H04W 72/40; H04W 92/18; H04L 1/0013; H04L 27/2607; H04L 27/38
See application file for complete search history.

(56) References Cited

U.S. PATENT DOCUMENTS

| | | |
|---|---|---|
| 11,700,095 B2 | 7/2023 | Sarkis et al. |
| 11,991,665 B2 | 5/2024 | Sarkis et al. |
| (Continued) | | |

FOREIGN PATENT DOCUMENTS

| | | |
|---|---|---|
| CN | 108352937 A | 7/2018 |
| WO | 2021067892 A1 | 4/2021 |
| WO | 2021087857 A1 | 5/2021 |

OTHER PUBLICATIONS

3GPP: "3rd Generation Partnership Project, Technical Specification Group Radio Access Network, NR, Multiplexing and Channel Coding (Release 15)", 3GPP TS 38.212, V15.7.0, Sep. 2019, 101 Pages.

(Continued)

*Primary Examiner* — Faruk Hamza
*Assistant Examiner* — Aixa A Guadalupe Cruz
(74) *Attorney, Agent, or Firm* — Patterson & Sheridan, LLP

(57) ABSTRACT

Certain aspects of the present disclosure provide techniques for mapping two-stage sidelink control with multiple layer sidelink data channel. A first user equipment (UE) can rate-match a multiple-layer second stage of a two-stage sidelink control information (SCI) transmission as a single layer. The first UE transmits the multiple-layer second stage of the two-stage SCI, to a second UE, using multiple antenna ports.

24 Claims, 8 Drawing Sheets

Related U.S. Application Data

(60) Provisional application No. 62/930,930, filed on Nov. 5, 2019, provisional application No. 62/915,453, filed on Oct. 15, 2019.

(51) Int. Cl.
  *H04L 27/26* (2006.01)
  *H04L 27/38* (2006.01)
  *H04W 72/02* (2009.01)
  *H04W 92/18* (2009.01)

(52) U.S. Cl.
  CPC ............. *H04L 27/38* (2013.01); *H04W 72/40* (2023.01); *H04W 92/18* (2013.01)

(56) References Cited

U.S. PATENT DOCUMENTS

| | | | |
|---|---|---|---|
| 2019/0182859 | A1 | 6/2019 | Khoryaev et al. |
| 2020/0022089 | A1 | 1/2020 | Guo |
| 2020/0351827 | A1 | 11/2020 | Chae et al. |
| 2021/0112525 | A1 | 4/2021 | Sarkis et al. |
| 2022/0086860 | A1 | 3/2022 | Panteleev et al. |
| 2022/0149987 | A1 | 5/2022 | Peng et al. |
| 2022/0159694 | A1* | 5/2022 | Peng ............... H04L 5/0094 |
| 2022/0167313 | A1* | 5/2022 | Zhou ............... H04W 72/20 |
| 2022/0271892 | A1* | 8/2022 | Peng ............... H04L 5/0064 |
| 2022/0303969 | A1* | 9/2022 | Hwang ............. H04L 5/0044 |

OTHER PUBLICATIONS

Apple: "Discussion on NR V2X Physical Layer Structure", 3GPP TSG RAN WG1 #98bis, R1-1910960, Chongqing, China, Oct. 14-30, 2019, pp. 1-6.

NTT Docomo, Inc: "Sidelink Physical Layer Structure For NR V2X", 3GPP TSG RAN WG1 #98bis, R1-1911168, Chongqing, China, Oct. 14-20, 2019, pp. 1-13.

OPPO: "Physical Layer Structure for NR-V2X", 3GPP TSG RAN WG1 #98bis, R1-1910372, Chongqing, China, Oct. 14-20, 2019, 15 Pages.

Panasonic: "Discussion on Physical Layer Structure for Sidelink in NR V2X", 3GPP TSG RAN WG1 #98bis, R1-1910841, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019, 9 Pages.

Qualcomm Incorporated: "Considerations on Physical Layer Aspects of NR V2X", 3GPP TSG RAN WG1 Meeting #98, R1-1909252, Prague, CZ, Aug. 26-30, 2019, 18 Pages.

Sequans Communications: "On NR Sidelink Physical Layer Structure", 3GPP TSG RAN WG1 Meeting #98bis, R1-1911306, Chongqing, China, Oct. 14-20, 2019, 6 Pages.

Sony: "Discussion on Physical Layer Structure for NR Sidelink", 3GPP TSG RAN WG1 #98bis, R1-1910764, Chongqing, China, Oct. 14-20, 2019, 5 Pages.

Huawei, et al., "Sidelink Physical Layer Structure for NR V2X", 3GPP TSG RAN WG1 Meeting #98, R1-1908039_Final, 3rd Generation Partnership Project, Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019, 32 Pages, XP051764662, section 5.3 section 2.

International Preliminary Report on Patentability—PCT/US2020/055330 The International Bureau of WIPO—Geneva, Switzerland, Apr. 28, 2022.

International Search Report and Written Opinion—PCT/US2020/055330—ISA/EPO—Feb. 8, 2021.

LG Electronics: "Discussion on Physical Layer Structure for NR Sidelink", 3GPP TSG RAN WG1 #99, R1-1912586, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019, XP051823493, 34 Pages, Section 2.1.1, 2.1.3, 2.1. 2.1.

Nokia, et al., "Discussion of Physical Layer Structure for Sidelink", 3GPP TSG RAN WG1 #98bis, R1-1910512—Nokia-5G V2X NRSL—Discussion of Physical Layer Structure for Sidelink, 3rd Generation Partnership Project, Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 8, 2019, XP051809140, 16 Pages, p. 4 p. 5-p. 6, table 1, paragraph [02.2], sections 1-3, figure 2.

Panasonic: "Discussion on Physical Layer Structure for Sidelink in NR V2X", 3GPP Draft, 3GPP TSG RAN WG1 #98bis, R1-1910841, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 7, 2019 (Oct. 7, 2019), XP051808978, 9 pages, p. 3-p. 5.

VIVO: "Physical Layer Structure for NR Sidelink," 3GPP Draft, 3GPP TSG RAN WG1 #98bis Meeting, R1-1910211, Physical Layer Structure for NR Sidelink Final, 3rd Generation Partnership Project (3GPP), Mobile Competence Centre, 650, Route Des Lucioles, F-06921, Sophia-Antipolis Cedex, France, vol. RAN WG1. No. Chongqing. China; Oct. 14, 2019-Oct. 20, 2019, Oct. 4, 2019 (Oct. 4, 2019), XP051808114, 20 pages, section 3.3.

Huawei., et al., "Sidelink Physical Layer Structure for NR V2X", R1-1908039, 3GPP TSG RAN WG1 Meeting #98 Prague, Czech Republic, Aug. 26-30, 2019, 32 Pages.

Samsung: "Feature Lead Summary#2 For Agenda Item 7.2.4.1 Physical Layer Structure for Sidelink", R1-1911703, 3GPP TSG RAN WG1 #98bis Meeting Chongqing, China, Oct. 14-20, 2019, pp. 1-29.

Spreadtrum Communications: "Discussion on Physical Layer Structure for Sidelink", R1-1910005, 3GPP TSG RAN WG1 #98bis Chongqing, China, Oct. 14-20, 2019, 14 Pages.

VIVO: "Physical Layer Structure for NR Sidelink", R1-1908148, 3GPP TSG RAN WG1 #98 Meeting Prague, CZ, Aug. 26-30, 2019, pp. 1-22.

* cited by examiner

MAPPING TWO-STAGE SIDELINK CONTROL WITH MULTI-LAYER SIDELINK DATA CHANNEL

CROSS-REFERENCE TO RELATED APPLICATION(S)

The present Application for Patent is a Continuation of U.S. patent application Ser. No. 17/068,561 by Sarkis et al., entitled "MAPPING TWO-STAGE SIDELINK CONTROL WITH MULTI-LAYER SIDELINK DATA CHANNEL" filed Oct. 12, 2020, which claims benefit of and priority to U.S. Provisional Application No. 62/930,930, filed Nov. 5, 2019, and to U.S. Provisional Application No. 62/915,453, filed Oct. 15, 2019, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly, to techniques for mapping a two-stage sidelink control with a multiple layer sidelink data channel.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved sidelink control information (SCI) transmission.

One or more aspects of the subject matter described in this disclosure can be implemented in a method for wireless communication by a first user equipment (UE). The method generally includes rate-matching a multiple-layer second stage of a two-stage SCI transmission as a single layer. The method generally includes transmitting the multiple-layer second stage of the two-stage SCI, to a second UE, using multiple antenna ports.

One or more aspects of the subject matter described in this disclosure can be implemented in an apparatus for wireless communication. The apparatus generally includes at least one processor and a memory coupled to the at least one processor. The memory generally includes code executable by the at least one processor to cause the apparatus to rate-match a multiple-layer second stage of a two-stage SCI transmission as a single layer. The memory generally includes code executable by the at least one processor to cause the apparatus to transmit the multiple-layer second stage of the two-stage SCI, to a UE, using multiple antenna ports.

One or more aspects of the subject matter described in this disclosure can be implemented in an apparatus for wireless communication. The apparatus generally includes means for rate-matching a multiple-layer second stage of a two-stage SCI transmission as a single layer. The apparatus generally includes means for transmitting the multiple-layer second stage of the two-stage SCI, to a UE, using multiple antenna ports.

One or more aspects of the subject matter described in this disclosure can be implemented in a computer readable medium storing computer executable code thereon for wireless communication. The computer readable medium generally stores code for rate-matching a multiple-layer second stage of a two-stage SCI transmission as a single layer. The computer readable medium generally stores code for transmitting the multiple-layer second stage of the two-stage SCI, to a UE, using multiple antenna ports.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
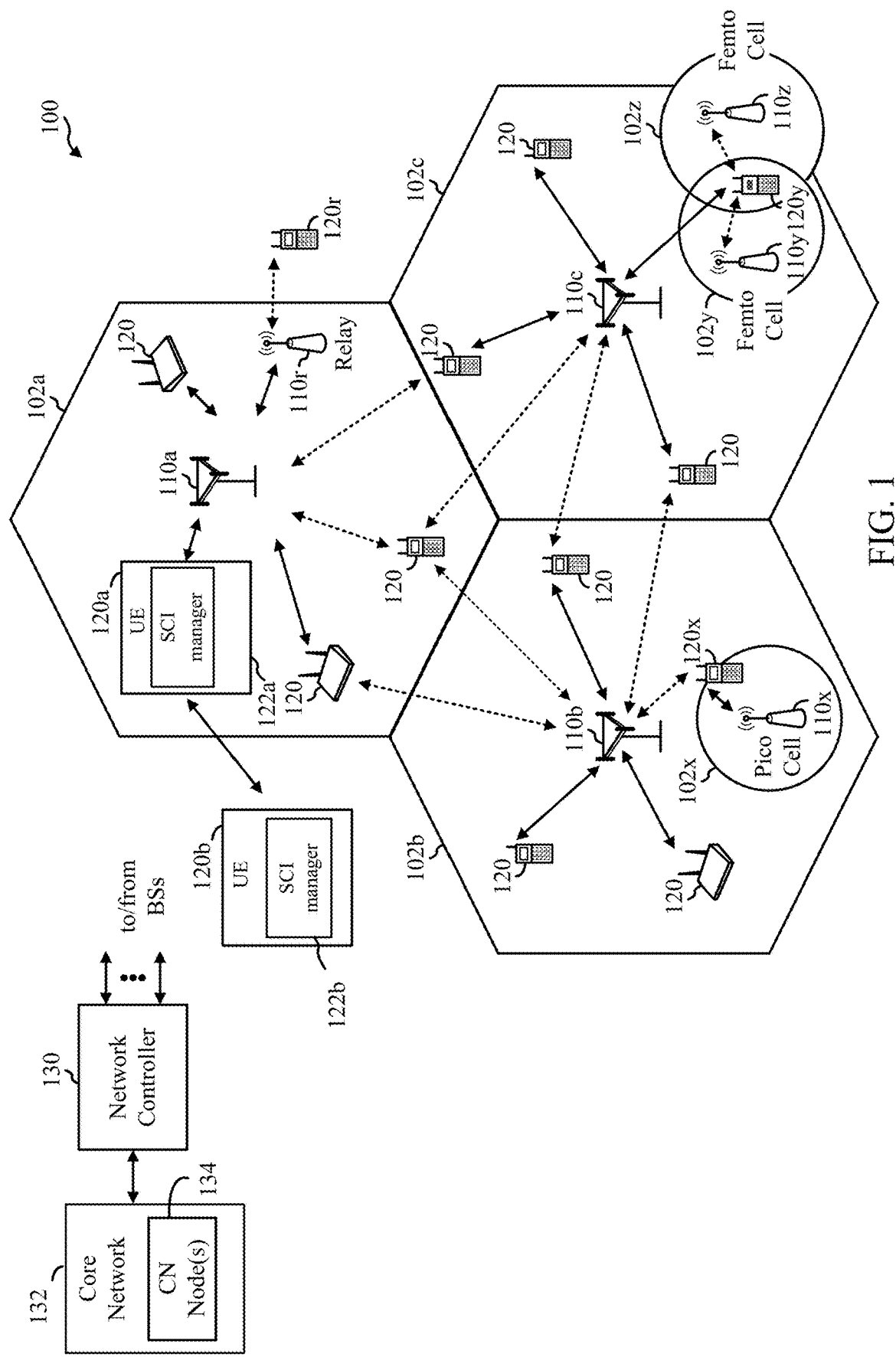
FIG. 1 is a block diagram conceptually illustrating an example telecommunications system, in accordance with certain aspects of the present disclosure.

Aspects of the present disclosure provide apparatus, methods, processing systems, and computer readable mediums for mapping two-stage sidelink control with a multiple-layer sidelink data channel. As will be described, the techniques presented herein allow mapping of the second stage of a two-stage sidelink control information (SCI) that is demodulated using demodulation reference signals (DMRS) of a multiple-layer sidelink data channel, even when the SCI and PSSCH have a different number of layers.

The following description provides examples of mapping two-stage sidelink control with multi-layer sidelink data channel that may be used for sidelink in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

NR may also support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs

110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 1022, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for sidelink communications. As shown in FIG. 1, the UE 110a includes a SCI manager 122a and the UE 120b includes a SCI manager 122b. The SCI manager 122a and/or the SCI manager 122b may be configured to map, transmit, receive, demap, and/or demodulate a two-stage SCI with a multi-layer sidelink data channel, in accordance with aspects of the present disclosure. As discussed in more detail below, the SCI manager 122a and/or the SCI manager 122b may rate-match the second stage of two-stage SCI to as a single layer and map the second stage of the two-stage SCI to multiple antenna ports.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
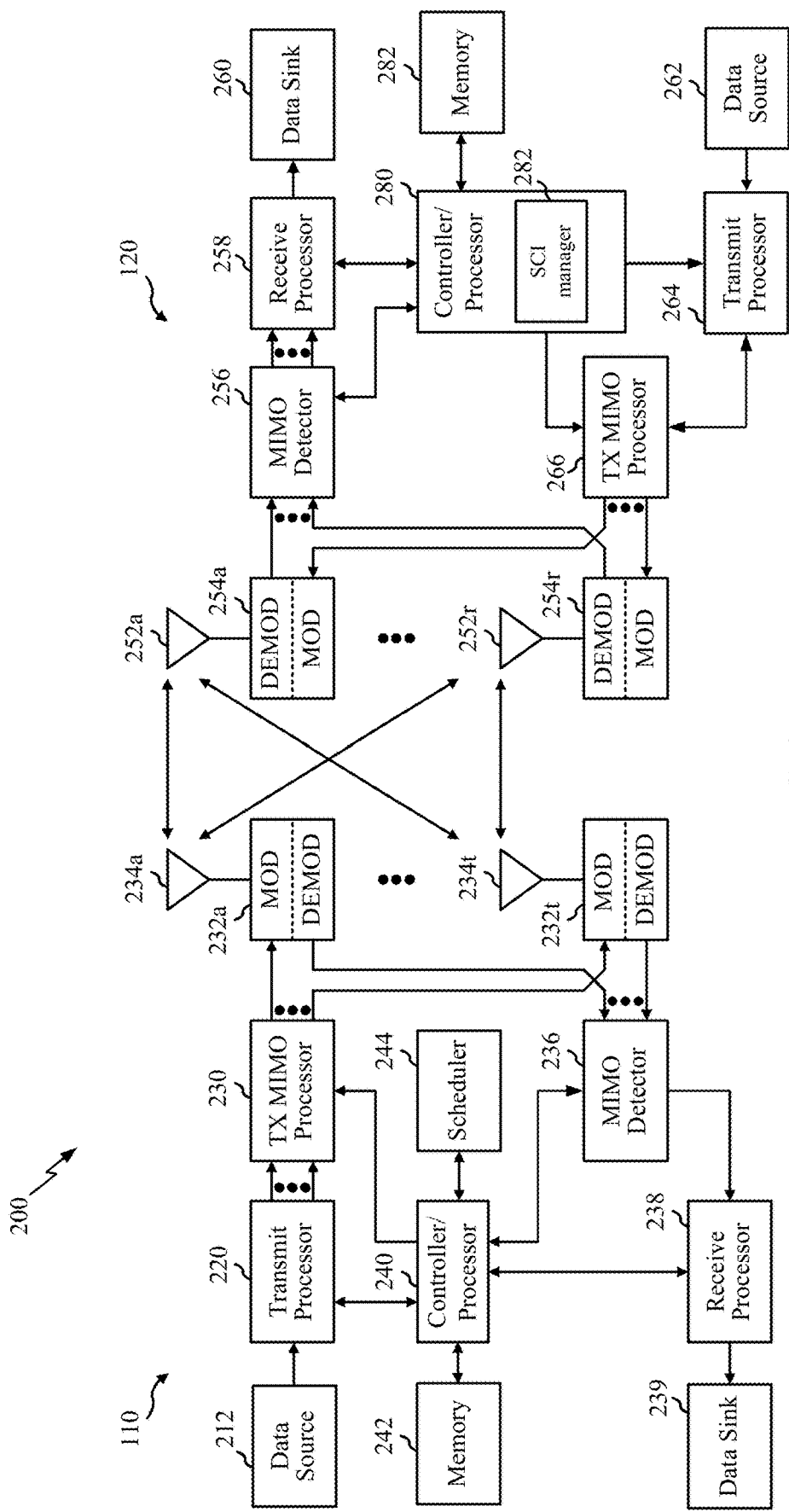
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1, which may be similar components in the UE 120b), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a BS may transmit a MAC CE to a UE to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a, or sidelink signals from the UE 120b, and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink or sidelink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238 may be used to perform the various techniques and methods described herein. The controller/processor 280 and/or other processors and modules at the UE 120a may perform or direct the execution of processes for the techniques described herein. For example, as shown in FIG. 2, the controller/processor 280 of the UE 120a has a SCI manager 222 that may be configured map, transmit, receive, demap, and/or demodulate a two-stage SCI with a multi-layer sidelink data channel, in accordance with aspects of the present disclosure. As discussed in more detail below, the SCI manager 222 may rate-match the second stage of two-stage SCI to as a single layer and map the second stage of the two-stage SCI to multiple antenna ports. Although shown at the controller/processor, other components of the UE 120a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
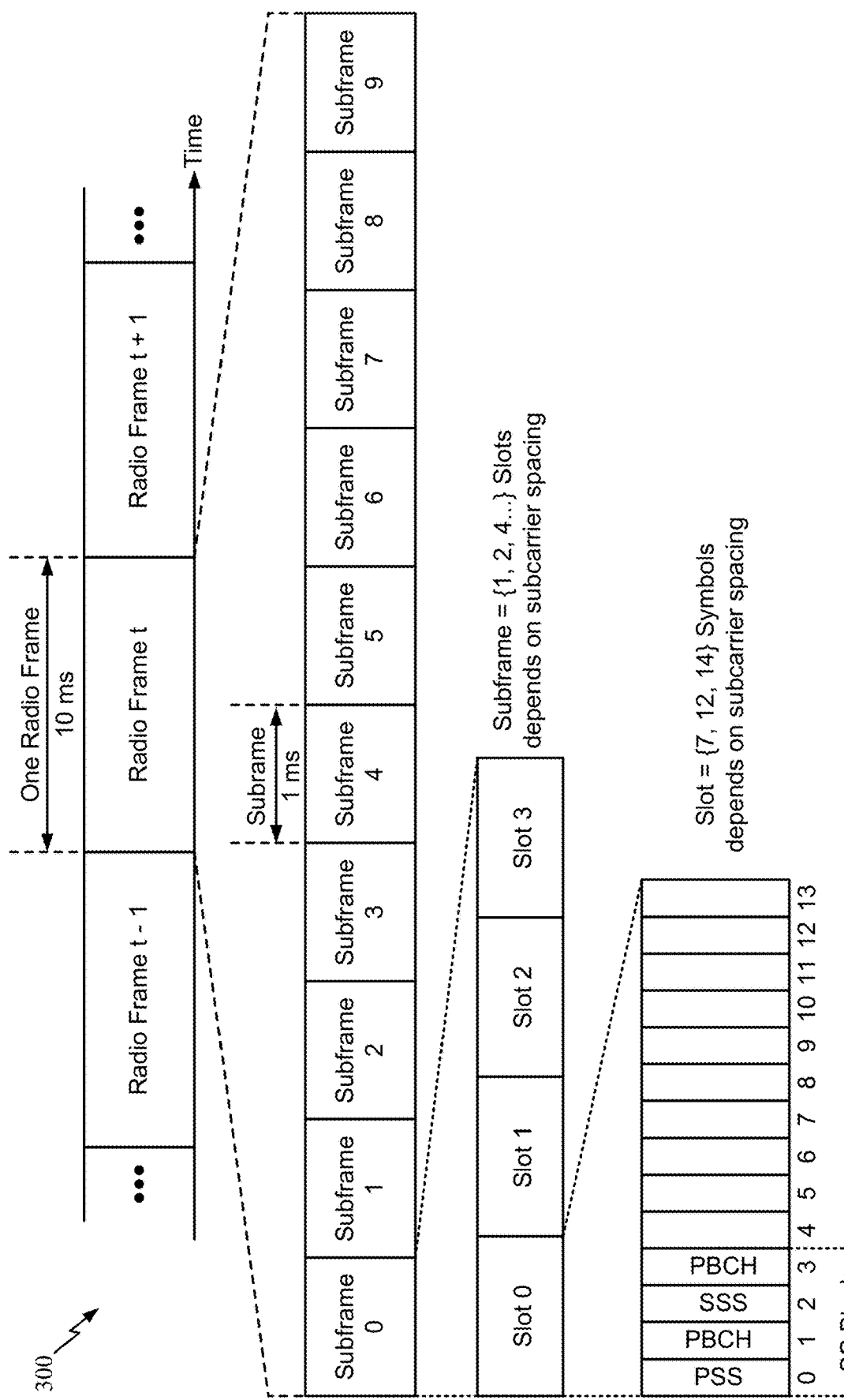
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4:
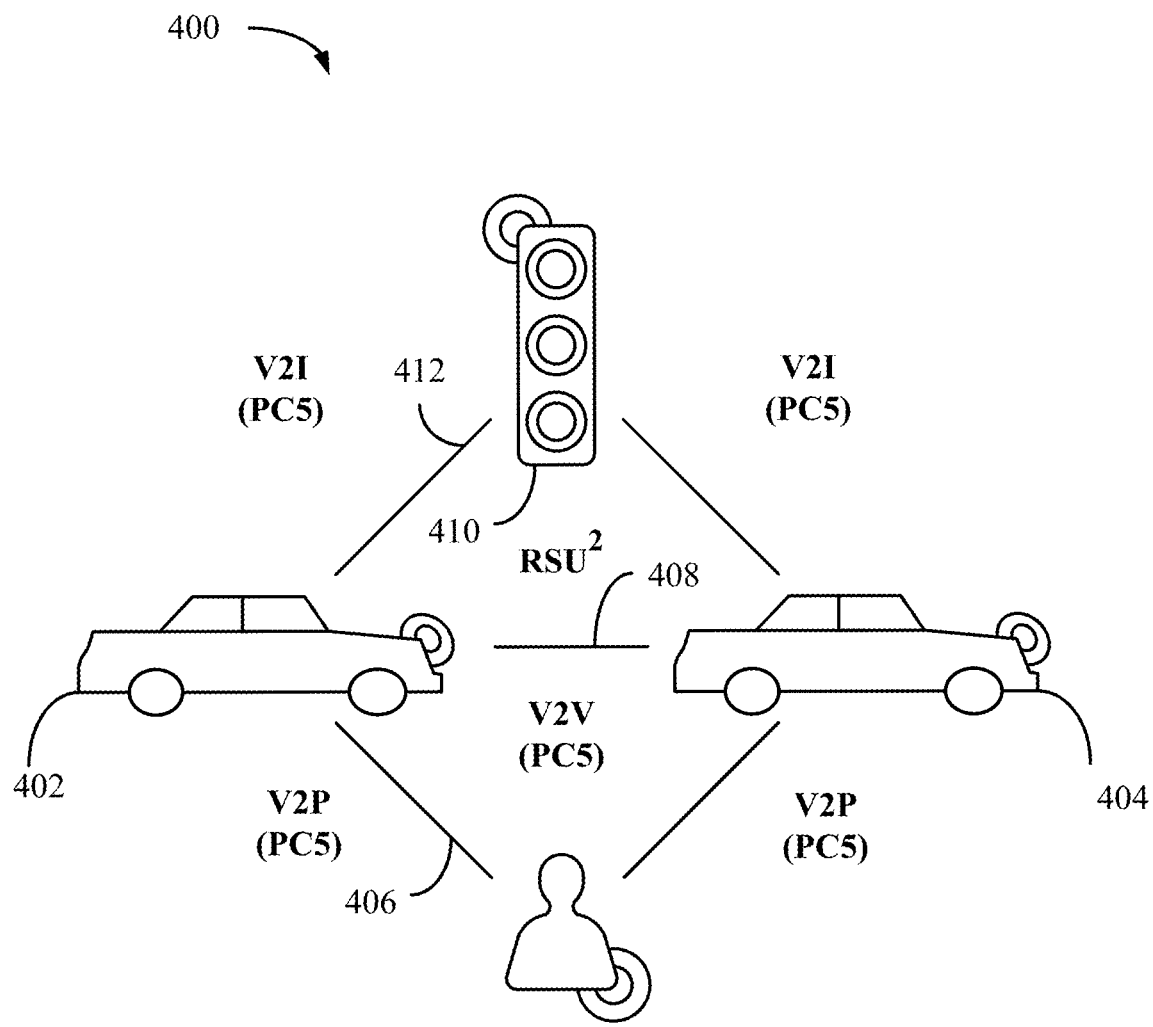
FIG. 4 illustrates an example vehicle-to-everything (V2X) communication system, in accordance with certain aspects of the present disclosure.
Figure 5:
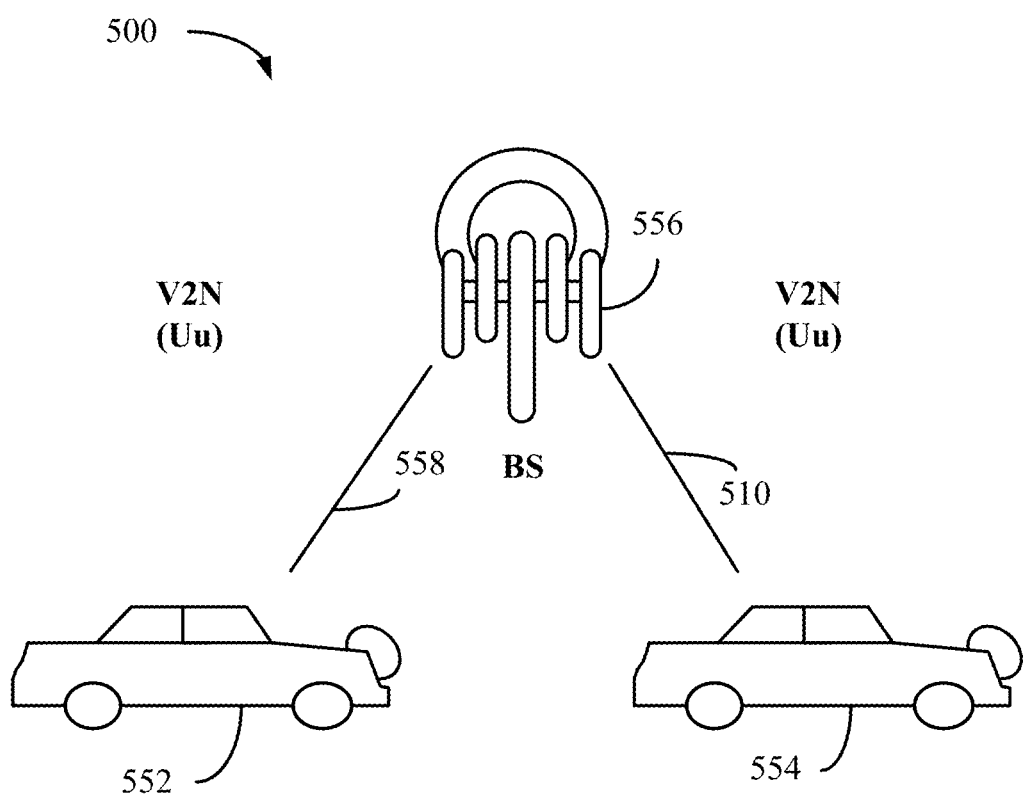
FIG. 5 illustrates an example V2X communication system, in accordance with certain aspects of the present disclosure.

FIG. 4 and FIG. 5 show diagrammatic representations of example V2X systems, in accordance with some aspects of the present disclosure. For example, the vehicles shown in FIG. 4 and FIG. 5 may communicate via sidelink channels and may perform sidelink CSI reporting as described herein.

The V2X systems, provided in FIG. 4 and FIG. 5 provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 552 and a vehicle 554 through a network entity 556. These network communications may occur through discrete nodes, such as a BS (e.g., the BS 110a), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QOS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

As mentioned above, aspects of the present disclosure relate to techniques for mapping two-stage sidelink control information (SCI) with multi-layer sidelink data channel.

In certain systems, such as NR systems (e.g., Release 16 NR), a two-stage SCI is transmitted between user equipment (UEs) in sidelink communications. The two-stage SCI may include a first stage (referred to as SCI-1) and a second stage (referred to as SCI-2).

The SCI-1 may include information regarding resource availability, such as resource reservation and resource allocation information, and information for decoding the SCI-2. The SCI-2 may include at least information for decoding data and information for determining the intended recipient of the transmission.

Figure 6:
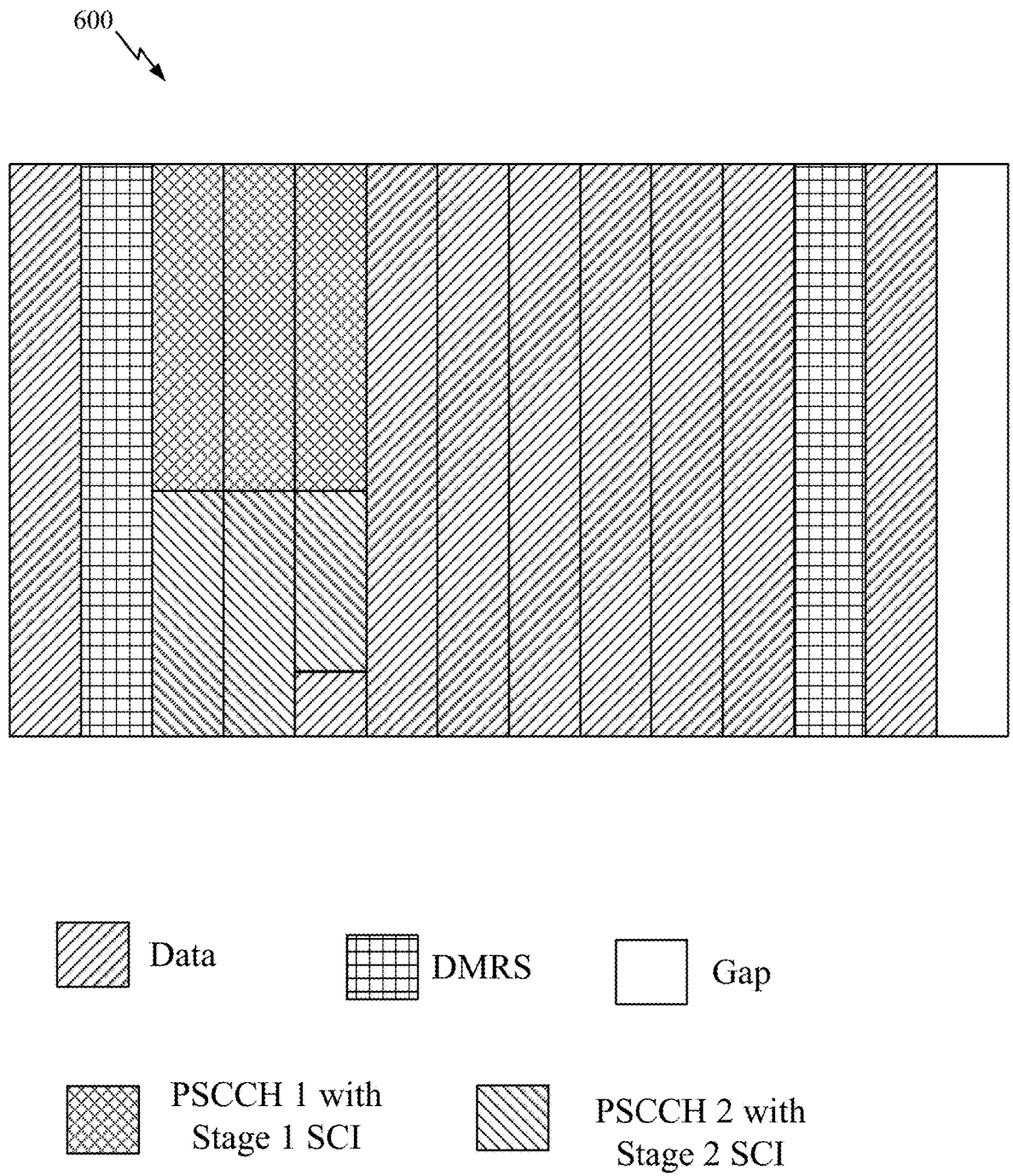
FIG. 6 is a diagram illustrating example sidelink data demodulation reference signal (DMRS) and two-stage sidelink control information (SCI) transmission in a slot, in accordance with certain aspects of the present disclosure.

FIG. 6 is a diagram illustrating example sidelink data channel, demodulation reference signal (DMRS) for the data channel, and two-stage SCI transmission in a slot 600, in accordance with certain aspects of the present disclosure. In some example, the SCI-1 is transmitted over the physical sidelink control channel (PSCCH), as shown in FIG. 6. In some examples, the SCI-2 may be transmitted over a second PSCCH, as shown in FIG. 6. In some examples, the SCI-2 may be transmitted (e.g., piggybacked) on the PSSCH (not shown).

According to certain aspects, the DMRS for the sidelink data channel (e.g., the PSSCH) is used to demodulate the SCI-2. For example, the PSSCH DMRS can be used to perform channel estimation for the SCI-2.

In some examples, the PSCCH may use 1 layer; however, the PSSCH can be more than 1 layer. Thus, the data sidelink channel may use multiple layers and the SCI-2 may be transmitted using only a single port of the multi-layer PSSCH. When the SCI-2 is sent with multi-layer PSSCH, there may be a power imbalance.

Accordingly, techniques and apparatus are desirable for mapping the second stage of the two-part SCI (e.g., the SCI-2) with a multiple-layer sidelink data channel, for example, even when the second stage of the two-part SCI and the data sidelink channel use different numbers of layers.

Example Mapping Two-Stage Sidelink Control with Multi-Layer Sidelink Data Channel As discussed above (e.g., with respect to FIG. 6), sidelink data channel demodulation reference signals (DMRS) can be used for channel estimation for a two-stage sidelink control. For example, the second stage (SCI-2) of the two-stage sidelink control information can be demodulated based on channel estimation using the physical sidelink shared channel (PSSCH) DMRS.

In some systems, a transmitting device, such as a sidelink user equipment (UE), generates bits (e.g., a sequence of information bits) for the SCI-2. The UE may then encode the bits (e.g., using polar code). The encoded bits are then rate-matched. After the rate-matching, the coded bits may be scrambled and modulated to produce the modulation symbols. The modulation symbols are then mapped to layers and then mapped to antenna ports. Precoding may be applied.

According to certain aspects, the UE rate-matches the SCI-2 as if it were a single layer, even though the PSSCH can be multiple layers. In some examples, the rate-matching involves bit selection and bit interleaving. In some examples, the rate-matching includes determining the number of coded modulation symbols to map to an antenna port. In an illustrative example, there may be 10 tones and 2 layers PSSCH. In this case, for rate-matching as 2 layers, the UE may assume 20 coded modulation symbols. According to aspects herein, however, the UE may rate-match the SCI-2 as a single layer. Thus, in the illustrative example, the UE may assume 10 code modulation symbols (e.g., the number of modulation symbols is assumed during the encoding). The rate-matched SCI-2 is then mapped to an antenna port.

According to certain aspects, when the PSSCH is more than one layer, the other layers of the SCI-2 are repetitions of the SCI-2 on a first layer. The SCI-2 duplicate layers are then mapped to the antenna ports. In some examples, precoder cycling may be applied. For example, different precoders may be used on different precoding resource block groups (PRGs). In some examples, the precoder cycling may be cyclic delay diversity (CDD) precoder cycling, where different precoders are applied on different tones.

The sequence of precoders and the precoder resource bundle size (e.g., the PRGs) may be known to both the transmitter and the receiver devices. For example, the sequence of precoders and/or precoder resource bundle size may be defined in a wireless specification, preconfigured (e.g., a preloaded configuration), configured (e.g., via a radio resource control (RRC) parameter), or indicated in the SCI-1 (e.g., via an index value).

According to certain aspects, when the PSSCH is more than on layer, the UE applies CDD (e.g., mandatory CDD when more than one layer is used for the SCI-2). Thus, the output on one antenna port is a cyclically time-shifted version of the output on the other antenna ports. In some examples, the CDD may be achieved by precoder cycling on a per-tone basis. In some examples, the SCI-2 rate-matching is repeated on the multiple layers, and the precoders are selected to apply the CDD to the layers.

According to certain aspects, the rate-matching as a single layer, duplicating layers, and/or CCD precoding is applied when a condition is satisfied (e.g., based on the UE determining the condition is satisfied). In some example, the condition is when the PSSCH is more than one layer. In some examples, the condition is when the SCI-2 is frequency division multiplexed (FDD) with data. In some examples, the condition is when the SCI-2 is FDMed with the SCI-1. In some examples, the condition is a combination of the above conditions.

According to certain aspects, the receiving device, such as a second sidelink UE, receives the SCI-2, decodes the SCI-2, and de-rate matches the SCI-2. In some cases, the second UE may choose to receive the SCI-2 on only one of the antenna ports. For example, based on a capability of the second UE.

According to certain aspects, when a second-stage control layer is a repetition of another, the modulation symbols in that layer may be permuted relative to the other layers. Permuting the modulations symbols may advantageously provide frequency diversity for the sidelink control transmission.

In some examples, the permutation may be a reversal of the modulation-symbol order. For example, the modulation symbols for a second, repeated, layer may be in reverse order of the modulation symbols mapped to the first layer.

In some examples, the permutation may be configured, or preconfigured. In some examples, the permutation may be indicated in the first stage of the sidelink control (e.g., SCI-1). For example, a set of different permutations may be configured, and the indication of the permutation may be an index value of one of the configured permutations in the set.

In some examples, whether or not to permute the modulation symbols for the layers may be configured or preconfigured. In some examples, an indication of whether the modulation symbols are permutated may be indicated in the first stage of the sidelink control (e.g., SCI-1). In some examples, toggling the permuting may allow the UE to reduce complexity at times and to increase frequency diversity at other times.

According to certain aspects, although the modulation symbols on the different layers may be permuted, the content (e.g., the information and coded bits) on each layer is the same. In some examples, the same modulation symbols are used for the different layers.

Figure 7:
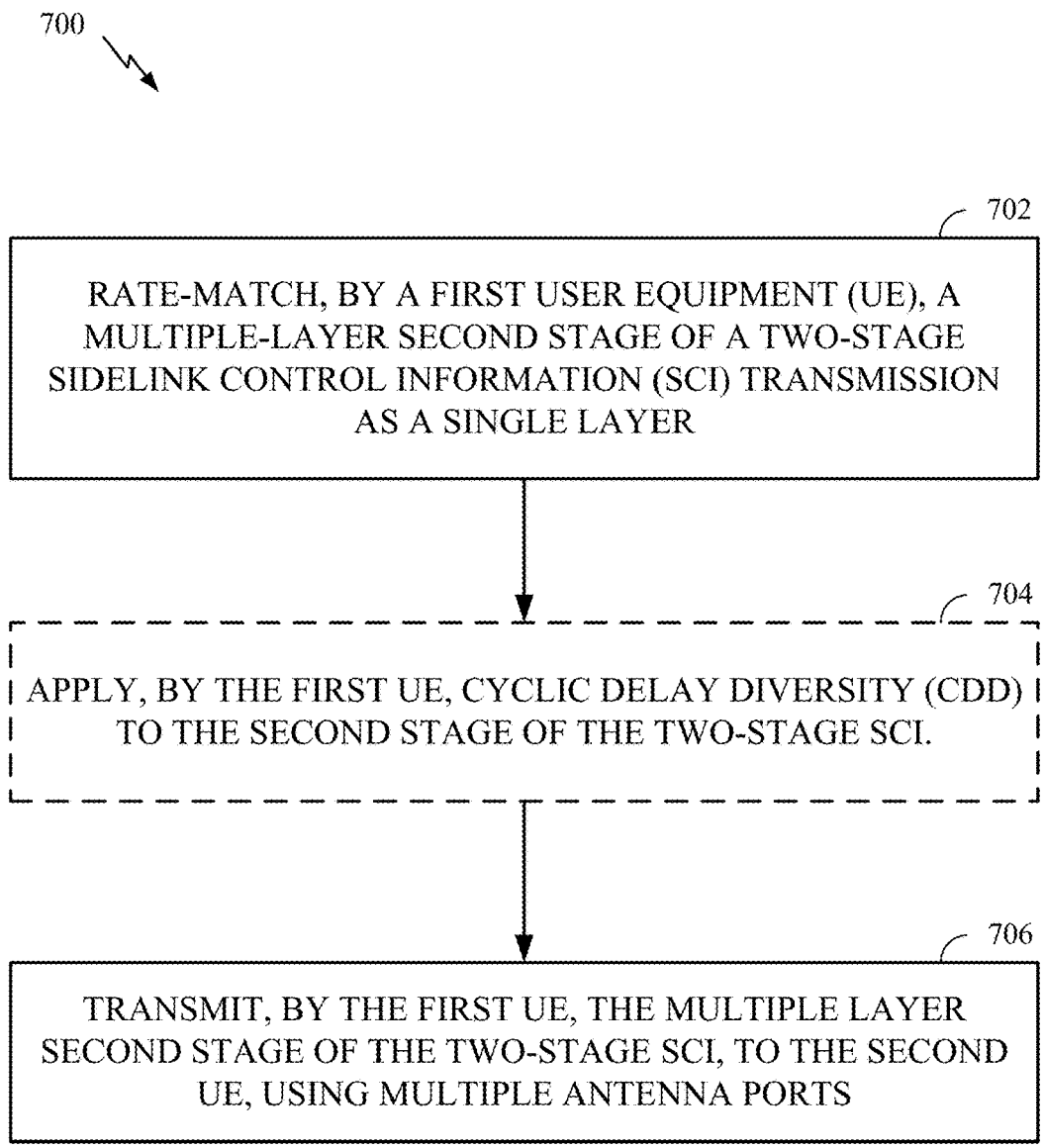
FIG. 7 is a flow diagram illustrating example operations by a UE for mapping a two-stage SCI transmission with a multiple-layer sidelink data channel, in accordance with certain aspects of the present disclosure.

FIG. 7 is a flow diagram illustrating example operations 700 for wireless communication, in accordance with certain aspects of the present disclosure. The operations 700 may be performed, for example, by a sidelink UE (e.g., such as a UE 120a in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 may begin, at 702, by rate-matching a multiple-layer second stage of a two-stage SCI transmission as a single layer. In some examples, the rate-matching includes determining a number of coded modulation symbols for second stage of the two-stage SCI based on a single layer.

According to certain aspects, the first UE maps the number of coded modulation symbols to an antenna port. In some examples, the first UE duplicates (e.g., repeats) the mapping of the number of coded modulation symbols on the multiple layers. In some examples, the first UE applies different precoders for different PRGs (e.g., precoder cycling). In some examples, the precoders and PRGs are specified at the first UE, configured, or indicated. For example, the first UE can indicate the precoders and PRGs to the second UE in a first stage of the two-stage SCI.

According to certain aspects, optionally at 704, the first UE applies CDD to the second stage of the two-stage SCI (e.g., mandatory CDD when a condition is met). For example, the first UE can apply precoder cycling per-tone. In this case, the second stage is transmitted with a cyclic time-shift at the output of the multiple antenna ports.

At 706, the first UE transmits the multiple-layer second stage of the two-stage SCI, to a second UE, using multiple antenna ports.

According to certain aspects, the first UE determines whether a condition is satisfied and performs the SCI-2 rate-matching as a single layer based on the determination. In some examples, the first UE determines a PSSCH has more than one layer. In some examples, the first UE determines the second stage of the two-stage SCI is FDMed with data. In some examples, the first UE determines the second stage of the two-stage SCI is FDMed with a first stage of the two-stage SCI. In some examples, the first UE determines a combination of the conditions are met. The first UE rate-matches the multiple-layer second stage of the two-stage SCI transmission as a single layer based on the determination. In some examples, the first UE duplicates the rate-matched SCI-1 on the multiple layers and/or applies CDD precoding to the layers when one or more of the conditions are met.

According to certain aspects, the two-stage SCI is transmitted with a PSSCH transmission. A first stage of the two-stage SCI may be transmitted on a first PSCCH and may carry resource availability information. The second stage of the two-stage SCI may be transmitted on a second PSCCH or on the PSSCH and may carry information to decode a data transmission.

Figure 8:
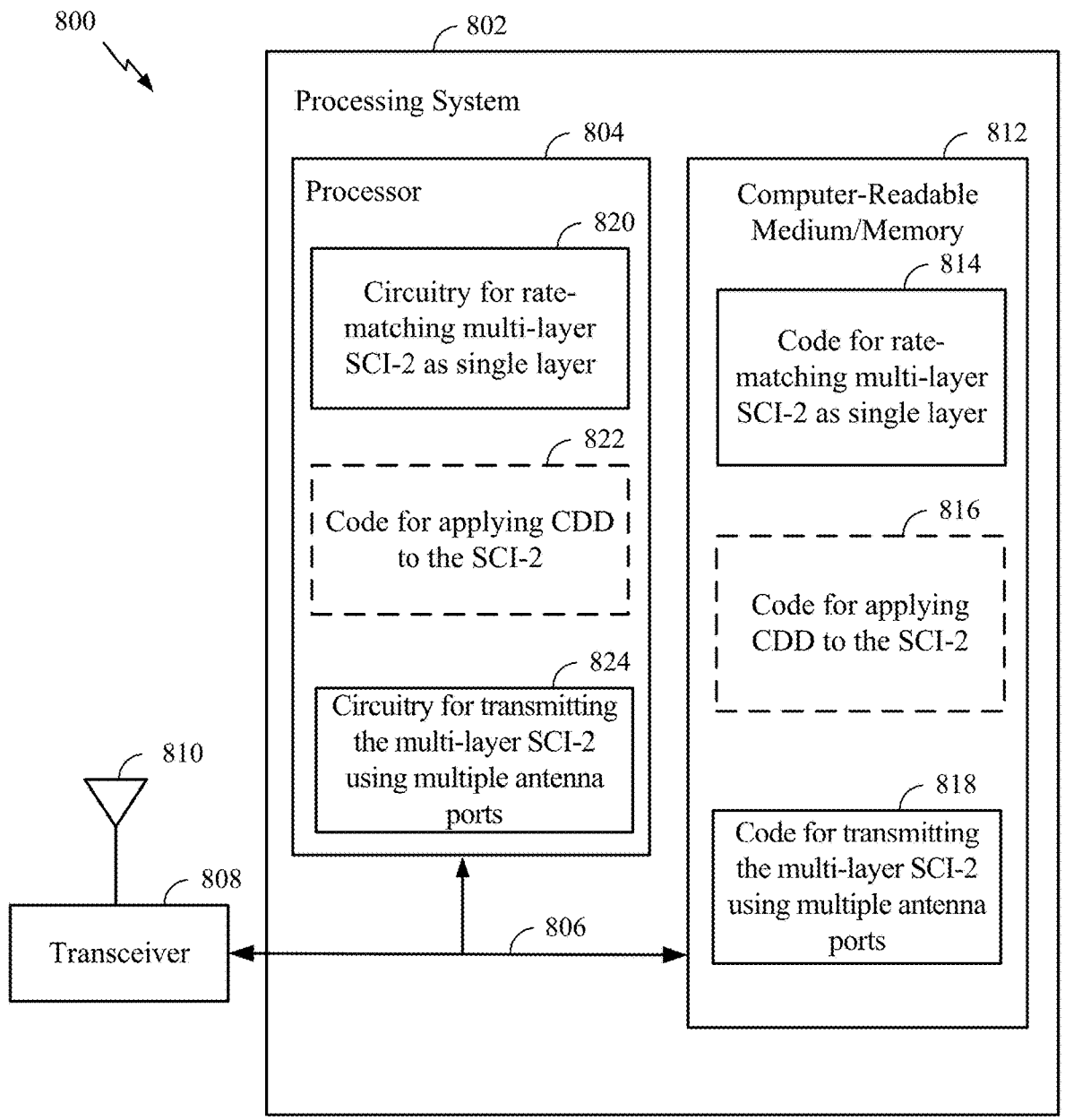
FIG. 8 illustrates an example communications device that may include various components configured to perform operations for the techniques disclosed herein in accordance with aspects of the present disclosure.

FIG. 8 illustrates a communications device 800 that may include various components (e.g., corresponding to meansplus-function components) configured to perform operations for the techniques disclosed herein, such as the operations illustrated in FIG. 7. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 7, or other operations for performing the various techniques discussed herein for mapping two-stage sidelink control with multi-layer sidelink data channel. In certain aspects, computer-readable medium/memory 812 stores code 814 for rate-matching a multiple-layer second stage of a two-stage SCI transmission as a single layer; code 816 for applying CDD to the second stage of the two-stage SCI; and/or code 818 for transmitting the multiple-layer second stage of the two-stage SCI, to a second UE, using multiple antenna ports, in accordance with aspects of the present disclosure. In certain aspects, the processor 804 has circuitry configured to implement the code stored in the computer-readable medium/memory 812. The processor 804 includes circuitry 820 for rate-matching a multiple-layer second stage of a two-stage SCI transmission as a single layer; circuitry 822 for applying cyclic delay diversity (CDD) to the second stage of the two-stage SCI; and/or circuitry 824 for transmitting the multiple-layer second stage of the two-stage SCI, to a second UE, using multiple antenna ports, in accordance with aspects of the present disclosure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
   rate-matching a multiple-layer second stage of a two-stage sidelink control information (SCI) as a single layer, wherein the rate-matching comprises determining a number of coded modulation symbols for the multiple-layer second stage of the two-stage SCI based on the single layer; and
   transmitting the multiple-layer second stage of the two-stage SCI, to a second UE, using multiple antenna ports, wherein the number of coded modulation symbols is mapped to each of the multiple antenna ports.

2. The method of claim 1, wherein transmitting the multiple-layer second stage of the two-stage SCI, to the second UE, using the multiple antenna ports comprises:
   repeating a first layer of the multiple-layer second stage of the two-stage SCI on each of the multiple layers.

3. The method of claim 2, further comprising permuting the modulation symbols for the first layer and the multiple layers.

4. The method of claim 3, wherein permuting the modulation symbols comprises ordering the modulation symbols for a second layer in reverse order of the modulation symbols for the first layer.

5. The method of claim 3, wherein the permuting is configured or preconfigured.

6. The method of claim 3, wherein a first stage of the two-stage SCI indicates the permutating.

7. The method of claim 6, wherein a plurality of permutation patterns are configured, and wherein the first stage of the two-stage SCI includes an index of one of the plurality of configured permutation patterns.

8. The method of claim 2, wherein the same information and coded bits are transmitted on each layer.

9. The method of claim 1, further comprising applying a different precoder for each precoder resource block group (PRG).

10. The method of claim 9, wherein the precoders and PRGs are specified at the first UE, configured, or indicated.

11. The method of claim 10, further comprising indicating the precoders and PRGs to the second UE in a first stage of the two-stage SCI.

12. The method of claim 1, further comprising applying cyclic delay diversity (CDD) to the multiple-layer second stage of the two-stage SCI.

13. The method of claim 12, wherein applying the CDD comprises applying precoder cycling per-tone.

14. The method of claim 12, wherein transmitting the multiple-layer second stage of the two-stage SCI comprises transmitting the multiple-layer second stage with a cyclic time-shift at an output of an antenna port.

15. The method of claim 1, further comprising:
   determining a physical sidelink shared channel (PSSCH) has more than one layer, wherein
   the rate-matching the multiple-layer second stage of the two-stage SCI as a single layer is based on the determination.

16. The method of claim 1, further comprising:
   determining the multiple-layer second stage of the two-stage SCI is frequency division multiplexed (FDM) with data, wherein
   the rate-matching the multiple-layer second stage of the two-stage SCI as a single layer is based on the determination.

17. The method of claim 1, further comprising:
   determining the multiple-layer second stage of the two-stage SCI is frequency division multiplexed (FDM) with a first stage of the two-stage SCI, wherein
   the rate-matching the multiple-layer second stage of the two-stage SCI as a single layer is based on the determination.

18. The method of claim 1, wherein:
   the two-stage SCI is transmitted with a physical sidelink shared channel (PSSCH) transmission;
   a first stage of the two-stage SCI is transmitted on a first physical sidelink control channel (PSCCH) and carries resource availability information; and the multiple-layer second stage of the two-stage SCI is transmitted on a second PSCCH or on the PSSCH and carries information to decode a data transmission.

19. An apparatus for wireless communications, comprising:
one or more memories, individually or collectively, comprising computer executable code; and
one or more processors, individually or collectively, configured to execute the computer executable code and cause the apparatus to:
rate-match a multiple-layer second stage of a two-stage sidelink control information (SCI) as a single layer, wherein the one or more processors, individually or collectively, configured to execute the computer executable code and cause the apparatus to rate-match comprises: the one or more processors being configured to, individually or collectively, cause the apparatus to determine a number of coded modulation symbols for the multiple-layer second stage of the two-stage SCI based on the single layer; and
transmit the multiple-layer second stage of the two-stage SCI, to another apparatus, using multiple antenna ports, wherein the number of coded modulation symbols is mapped to each of the multiple antenna ports.

20. The apparatus of claim 19, wherein the one or more processors being configured to, individually or collectively, cause the apparatus to transmit the multiple-layer second stage of the two-stage SCI, to the other apparatus, using the multiple antenna ports comprises:
the one or more processors being configured to, individually or collectively, cause the apparatus to repeat a first layer of the multiple-layer second stage of the two-stage SCI on each layer of the multiple-layer second stage of the two-stage SCI.

21. The apparatus of claim 20, wherein the one or more processors are configured to, individually or collectively, cause the apparatus to permute modulation symbols for each layer of the multiple-layer second stage of the two-stage SCI.

22. The apparatus of claim 21, wherein the one or more processors being configured to, individually or collectively, cause the apparatus to permute the modulation symbols comprises the one or more processors being configured to, individually or collectively, cause the apparatus to order the modulation symbols for a second layer in reverse order of the modulation symbols for the first layer.

23. An apparatus for wireless communications, comprising:
means for rate-matching a multiple-layer second stage of a two-stage sidelink control information (SCI) as a single layer, wherein the means for the rate-matching comprises means for determining a number of coded modulation symbols for the multiple-layer second stage of the two-stage SCI based on the single layer; and
means for transmitting the multiple-layer second stage of the two-stage SCI, to another apparatus, using multiple antenna ports, wherein the number of coded modulation symbols is mapped to each of the multiple antenna ports.

24. A non-transitory computer readable medium storing computer executable code thereon for wireless communications by a first user equipment (UE), comprising:
code for rate-matching a multiple-layer second stage of a two-stage sidelink control information (SCI) as a single layer, wherein the code for the rate-matching comprises code for determining a number of coded modulation symbols for the multiple-layer second stage of the two-stage SCI based on the single layer; and
code for transmitting the multiple-layer second stage of the two-stage SCI, to a second UE, using multiple antenna ports, wherein the number of coded modulation symbols is mapped to each of the multiple antenna ports.

* * * * *